Figure 1:
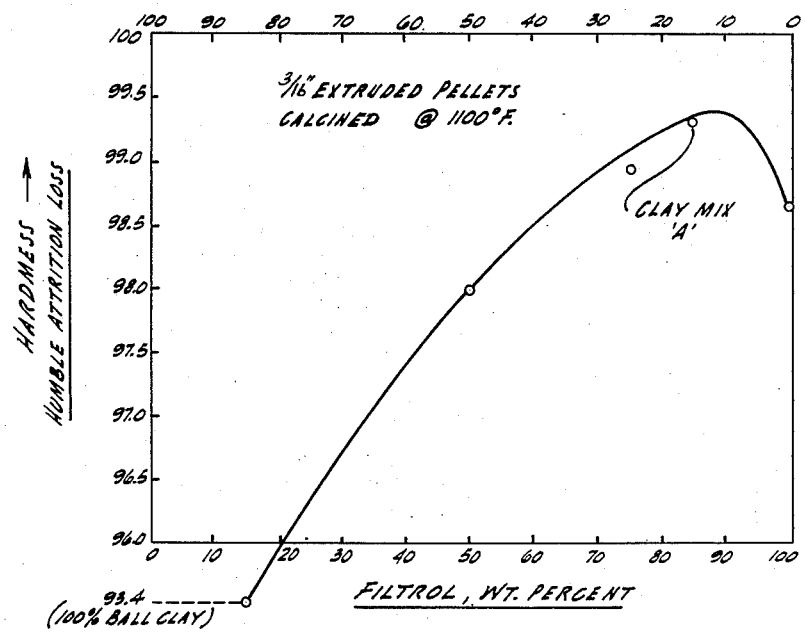

INVENTOR.
ROSS A. HANSON,
BY
Lannas S. Henderson
AGENT.

United States Patent Office 2,759,899
Patented Aug. 21, 1956

2,759,899

CONVERSION CATALYSTS AND PROCESSES FOR BONDING THE CATALYST COMPOSITES

Ross A. Hanson, Fullerton, Calif., assignor to Union Oil Company of California, Los Angeles, Calif., a corporation of California Application October 3, 1952, Serial No. 312,946

18 Claims. (Cl. 252—450)

This invention relates to new catalyst compositions having a high degree of hardness and resistance to abrasion, and to methods for preparing and utilizing the same. These catalysts are particularly useful in hydrocarbon conversion processes such as cracking, reforming, hydroforming, desulfurization, denitrogenation, hydrogenation, dehydrogenation, isomerization, alkylation, dealkylation, etc.

Briefly, the catalysts described herein comprise, as an essential element, a composite of an acid-washed, non-swelling bentonite-type clay with certain proportions of kaolin-type clays. This clay composite is then preferably compounded further with an alumina component, and still more desirably, also with one or more of the oxides of the heavy metals, i. e. metals having an atomic number of 22 or above. The particular clay composites employed herein are found to contribute a degree of hardness to the finished catalyst which is not obtainable with either type of clay alone. The clay composite itself is found to have good cracking properties and is useful primarily, though not exclusively, in that field. The addition of alumina increases the activity of the catalyst for promoting reforming reactions such as isomerization and cyclization. The further addition of a heavy metal oxide promotes reforming reactions and also favors the hydrogenation-dehydrogenation type reactions, which may result in aromatization, desulfurization or denitrogenation.

Modern catalytic processes require catalysts which are not only specifically active in the chemical reactions which are to be catalyzed, but also possess physical characteristics required for successful commercial operation. Of outstanding importance are bulk density and hardness; that is, resistance to attrition. The ability of a particle to hold its shape notwithstanding the mechanical handling to which it is subjected in storage, shipment, and use is a primary requirement for a successful catalyst for modern catalytic processes.

Catalytic processes are classifiable in three categories. In fixed bed type processes, the catalyst is positioned in a bed through which the feed material flows. The bed is stationary. It is preferable to employ catalyst particles of predetermined particle size and particle size distribution in order that the required free space between the particles be attained. The screen analysis of the catalyst, if it is unpelleted, or the pellet size, if it is pelleted, is carefully controlled in the manufacture of a catalyst for this purpose. It is desirable that the particles or pellets maintain their size in shipping, handling, and in the charging of the catalyst bed, and resist crushing due to the weight of the catalyst in the bed.

In moving bed type processes, the bed of catalyst is in continuous motion. Spent catalyst is continuously discharged from the bottom of the catalytic reactor and fresh catalyst is continuously fed into the top of the reactor. The spent catalyst is regenerated in a regenerating zone and returned to the catalyst reactor. In this form of process the mechanical strength of the catalyst is of great importance since in its motion through the reactor it is subjected to considerable crushing and abrasion forces. It is also subjected to these forces in its passage to and through the regeneration zone and in its passage to the catalyst reactor. In this type of process it has been found most useful to employ the catalyst in pellet or tablet form. The strength of the catalyst pellet as well as the characteristics of the individual particles which make up the pellets are of highest importance.

In fluid type catalytic processes the catalyst is usually subdivided into small fragments, or is in powder form. It is fed into a moving stream of vapor undergoing catalysis and passes, while suspended in the vapor stream, through a reactor. It then discharges into a separating zone which may be either the mechanical separating type or the Cottrell type precipitator, or a combination of both. The separated catalyst is then fed into a regeneration zone and the regenerated particles are reintroduced into the fluid stream passing the catalyst reactor. In this type of process the individual particles are under abrasive forces of some magnitude and the disruption of the particle size introduces variables into the process controls which are undesirable, as well as rendering difficult the separation of catalyst fines.

In all three forms of catalytic processes, the hardness of the catalyst as manufactured and its hardness under the conditions of the process in which it is employed is of great importance in maintaining the desired particle size, and preventing loss of catalyst.

In addition to adequate hardness, the catalyst must also possess a desirable degree of activity for the particular conversion process in which it is employed. Obtaining both of these desired qualities is an interrelated problem, and in practice neither can be successfully dealt with to the exclusion of the other. It often happens that catalytic materials may be combined in a manner which yields very hard catalyst granules but very low activity. Conversely, the same materials may be compounded by other methods to yield a catalyst having high activity, but unsatisfactory hardness. Both factors must therefore be considered in evaluating any given catalyst.

Catalysts in the form of relatively large aggregates or lumps are generally prepared by one of two methods; tableting or extruding. The term "tableting" as used herein means the process wherein the powdered raw materials, with or without an added lubricant such as graphite, are first mixed, usually in a substantially dry state, and portions thereof are placed in small individual compression-molds and compressed by means of a reciprocating piston. The tablets are then usually calcined to activate the catalytic materials and to combust the lubricant. This procedure results in hard, smooth-surfaced tablets of any desired size, depending on the size of the mold. This procedure is inherently more expensive than the extrusion method.

"Extrusion," as employed herein, means that process wherein the powdered raw materials are admixed with sufficient water or other liquid to form a paste which is then extruded through a die of any given size and cross-sectional shape, and the extrude is cut or broken off at regular intervals to form pellets of any desired length. These pellets are then dried and calcined if desired. Extrusion seldom requires the addition of a solid lubricant, and thus eliminates the necessity for burning out the lubricant from the finished pellets. In either tableting or extruding any desired pressure may be utilized, and the hardness of the resulting tablets or pellets generally varies directly with the pressure employed. However, with any given mixture of raw materials, it is generally found that tableting produces a harder finished product than does extrusion. However, by modifying the composition of the mix, it is now found that extruded pellets may be produced comparing favorably in activity and hardness with a tableted mix containing the same essential active ingredients.

Some catalytic materials, for example alumina, do not possess sufficient plasticity as a wet mix to be effectively extruded, and it has in the past been considered necessary to tablet such materials. It has now been found that such nonplastic materials may be compounded with the clay mixtures described herein to produce a readily extrudable mass, and that the final product compares favorably in catalytic activity and hardness with the tableted alumina compositions.

From the above it will be seen that it is an object of this invention to provide catalyst particles having a high degree of resistance to abrasion, regardless of the method employed for forming the particles.

A further object is to provide catalyst mixes especially adapted for forming abrasion-resistant pellets by extrusion.

A still further object is to provide methods and means for plasticizing certain non-plastic catalyst compositions in order to render them amenable to extrusion to form pellets having a high degree of hardness and catalytic activity.

Another object is to provide catalysts having a high degree of activity for the cracking, reforming, hydroforming, desulfurization, and denitrogenation of hydrocarbon fractions, and other similar materials and processes.

Other objects will be apparent to those skilled in the art from the following description.

CLAY COMPOSITE

This invention is based primarily upon the discovery of a particular clay composite which gives a maximum degree of hardness to catalyst compositions in which it is embodied. This composite consists of a major amount, preferably between about 65% and 95% of an acid-washed non-swelling bentonite type clay, and a minor amount, preferably from about 5% to 35% of a kaolin-type clay. Mixtures of these clays in the above composition range, when formed into extruded pellets, dried and calcined, are found to exhibit a degree of hardness greater than that of either clay singly or in other proportions. This relationship is set forth in attached Fig. 1 which is a graph showing the relationship between particle hardness and composition. This shows clearly that a peak in hardness is reached when the composition contains between 85–90% Filtrol, which is an acid-washed bentonite clay. This optimum proportion relationship is found to hold also when other materials such as alumina or molybdena are included in the mix. The details of Fig. 1 will be explained more fully hereinafter.

The quality of hardness of abrasion-resistance is measured herein by means of a Humble attrition-loss apparatus. This consists of a metal can, cylindrical in shape, having two internally mounted baffle plates extending longitudinally along opposite sides of the cylinder. In operation the can is mounted for horizontal, axial rotation, and 100 grams of the catalyst particles are admitted, and the can is then rotated at 60 R. P. M. for one hour. At the end of this period the solid material is removed and screened to separate the fines which pass through a 20 mesh screen. The fines collected are then weighed, and the attrition loss is expressed as:

$$A = \frac{\text{Weight of fines}}{\text{Original weight of particles}} \times 100$$

The attrition loss is inversely proportional to the hardness of the particles, and the hardness may be expressed as:

$$H = 100 - A$$

This value for hardness thus represents the per cent by weight of the original material which was not abraded from the particles during the test.

The values for hardness expressed herein all represent the hardness of the finished, calcined catalyst particles, as distinguished from particles which are merely dried at e. g. 250–400° F. Calcined hardness is the hardness of the catalyst which has been heated to between about 600° F. and 1500° F. for from 1 to 16 hours, thereby removing part of the combined water and usually activating the catalyst by altering its crystalline structure.

The activated bentonite type clays and the kaolin-type clays employed herein may be distinguished from each other, and from other clays, by any of their many different properties. The bentonite clays, as found in nature, contain a high proportion of the montmorillonite-type minerals including montmorillonite, beidellite, nontronite, hectorite, saponite, and sauconite. Montmorillonite is often characterized at $(Al_2O_3.4SiO_2.H_2O+xH_2O)$. The kaolin clays are rich in kaolin minerals including kaolinite

$(Al_2O_3.2SiO_2.2H_2O)$ dichite, nacrite, anauxite, hallyosite and endellite. Kaolin clays are usually found to contain between about 30% to 40% $Al_2O_3$, while bentonite clays usually contain less than 20% thereof. Another important characteristic of bentonite clays is their high cationic base-exchange capacity, commonly running between 80 and 90 m. e. per 100 grams of air dried clay; the crystal lattice is obviously weakly bonded. Kaolin clays on the other hand show a low cationic base-exchange capacity, in the order of 10 m. e. per 100 grams of dry clay. X-ray crystallography shows the montmorillonite minerals to have three layer lattices while kaolin minerals have a two layer crystal lattice. Differential thermal analysis curves for montmorillonite show three endothermic peaks at 150–320°, 695–730° and 870–920° C., and one exothermic peak at 925–1050° C. Similar curves for kaolinite show a strong endothermic peak at 620° C. and a strong exothermic peak at 980° C., which sharply differentiate it from other clay mineral groups. Other important characteristics of these clays are summarized in Encyclopedia of Chemical Technology, vol. 4, pp. 24–85; R. E. Kirk, Ed., Interscience Encyclopedia Inc., New York, 1949.

The non-swelling or sub-bentonite clays employed herein occur in many widely separated locations including Arizona, California, Texas, Arkansas, Mississippi, Kentucky, Tennessee and in many foreign countries. Swelling type bentonites are found in Wyoming, South Dakota, Montana, Utah, Nevada and California. It is preferred to employ herein the non-swelling or sub-bentonite clays, inasmuch as they are more readily activable, as by acid washing, than are the swelling varieties. For this purpose it is preferred to employ a high-grade sub-bentonite in which the mineral montmorillonite predominates. These clays are ordinarily activated by treatment with a mineral acid such as sulfuric acid. One hundred pounds of clay (volatile-free basis) may be treated with, for example, from about 20 pounds to 150 pounds of $H_2SO_4$. The acid may range in strength from about 5% to 60%, calculated on the total water content of the mix, including the water content of the clay. Time of treatment may vary between about 1 and 12 hours and the temperature between about 0–212° F. A desirable degree of extraction is such as to yield a final $Al_2O_3$ plus $Fe_2O_3$ content ranging between 10% and 20%, preferably about 15% and 20%. One hundred pounds of a typical Arizona sub-bentonite may for example be treated with 30 pounds of $H_2SO_4$ as a 12% solution for 6 hours at 200–212° F. Analyses of the native clay and the acid treated product show the following characteristic results on a dry basis:

|  | Percent by Weight | |
| --- | --- | --- |
|  | Before Treatment | After Treatment |
| $SiO_2$ | 67.3 | 71.5 |
| $Al_2O_3$ | 19.5 | 16.3 |
| $Fe_2O_3$ | 1.8 | 2.4 |
| $CaO$ | 3.2 | 2.3 |
| $MgO$ | 6.9 | 4.5 |

If the catalyst is to be used for treating hydrocarbon stocks high in sulfur compounds, it is desirable to reduce the $Fe_2O_3$ content of the bentonite clay to as low a figure as is practicable, preferably below about 1%. In this manner, the catalyst is rendered much more resistant to sulfur-poisoning, and retains its activity for longer periods of time.

However, the $Al_2O_3$ plus $Fe_2O_3$ content should preferably not be reduced by acid treatment below about 10% if the catalyst mixture is to be extruded, since clays which are more severely acid-treated lose their plasticity, and hence their extrudability. A very suitable clay prepared along the lines indicated above is known in the trade as Filtrol, obtainable from the Filtrol Corporation, Los Angeles, California. This material has the following calcined composition:

|  | Percent |
|---|---|
| $SiO_2$ | 70 |
| $Al_2O_3$ | 17 |
| $Fe_2O_3$ | 2 |
| MgO | 5 |
| CaO | 3 |
| $H_2O$ | 3 |

The kaolin clays employed herein occur for example in North Carolina, South Carolina, Georgia, Florida, and Vermont. A species of highly plastic kaolin known as Ball clay, and found in western Tennessee, Kentucky and New Jersey is especially suitable for use herein. No special pre-treatment of these clays is ordinarily required other than grinding to reduce any coarse aggregates to a powder form. In some cases a dilute acid washing may be desirable. A suitable Ball clay may be obtained for example from Western Talc Company, Los Angeles, California, having initially the following analysis:

|  | Percent |
|---|---|
| $SiO_2$ | 51.6 |
| $Al_2O_3$ | 33.7 |
| $Fe_2O_3$ | 0.8 |
| CaO | 0.14 |
| MgO | 0.27 |
| $H_2O$ | 11.9 |

*Example 1*

The above type of Ball clay and Filtrol clay were the specific types compounded (in their uncalcined forms) to give the data shown in Fig. 1 and Table 1. In all cases the compositions were prepared by first thoroughly and intimately admixing the indicated proportions (calcined basis) of the two clays in powder form, adding sufficient water to produce a plastic, extrudable mass, and then extruding under approximately 200 p. s. i. g. pressure through 3/16 inch circular orifices. The extrude was cut in 3/16 inch lengths, dried at about 220° F. and calcined at about 1100° F. for 2–6 hours. Hardness was then determined as described above. The results were as follows:

TABLE 1

| Catalyst | Composition, percent by dry weight | | Hardness, Humble Attrition |
|---|---|---|---|
|  | Filtrol | Ball Clay |  |
| 1 | 0 | 100 | 93.4 |
| 2 | 50 | 50 | 98.0 |
| 3 | 75 | 25 | 98.9 |
| 4 | 85 | 15 | 99.3 |
| 5 | 100 | 0 | 98.7 |

To utilize these clay composites as cracking catalysts, the pelleted material containing 85% Filtrol and 15% Ball clay indicated as "Mix A" in Figure 1 for example is contacted with vapors of a gas oil derived from a Santa Maria crude, and having a boiling range of 450 to 900° F., and an A. P. I. gravity of 33. The conditions of reaction are: bed temperature 925° F.; pressure 30 p. s. i. g.; rate, 1 volume oil (liquid) per volume of catalyst per hour. Total liquid recovery is about 92% by volume of charge, with losses to gas and coke about 10%. The yield of gasoline is about 40% by volume. Other cracking conditions may be employed, for example, temperatures of 800 to 1200° F., pressures 0–500 p. s. i. g., liquid hourly space velocity—0.5 to 10. The same catalyst may be utilized in fluidized cracking processes by grinding the pellets to obtain powders of about 200 to 400 standard mesh or finer. In any cracking process, the catalyst particles eventually become relatively inactive due to coke deposits. Ordinarily therefore, they are regenerated when they have accumulated from 1 to 4% by weight of coke. Regeneration is accomplished by combustion with air or oxygen at from about 900 to 1500° F.

CLAY-ALUMINA COMPOSITIONS

Refractory oxides such as precipitated gel-type alumina, silica, silica-alumina, titania, thoria, zirconia or magnesia which are not themselves extrudable may be formed into readily extrudable mixtures by incorporating therein from about 10% to 70% by weight (dry) of the above described clay mixtures. The finished catalyst will thus contain between about 30% and 90% by weight of the gel-type oxide. Here again the relative proportion of the two clays in the final pellet is an important factor, mixtures containing a weight ratio of bentonite to kaolin between about 2.5/1 and 20/1 being harder than those containing other ratios thereof. In addition another important factor appears, i. e., the particle size of the alumina employed. It has been found that the pellet hardness increases with the use of more finely divided aluminas. Thus, a mixture composed of 50% of 230 mesh alumina, 42.5% Filtrol clay and 7.5% Ball clay may be wetted to plasticity, extruded into 3/16 inch pellets as described above, dried and calcined at 1100° F. for 10 hours, and then tested for hardness as above described employing the Humble attrition apparatus. The hardness of such pellets is found to range between about 97.25 and 97.8, while the hardness of similar pellets prepared from 330 mesh alumina ranges between 98.25 and 99. It is therefore preferred to employ aluminas, or other refractory oxides, having an average particle size smaller than about 300 mesh.

The hardness of clay-alumina compositions also increases slightly with increasing total content of the clay mixture above 50%. Mixtures containing 50% alumina and 50% clay (85% Filtrol, 15% Ball clay), when prepared and tested as outlined above, show a hardness of about 97.5, while similar mixtures containing only 30% alumina and 70% of the clay mixture have a hardness of about 97.8. This small increase in hardness is usually outweighted by loss in activity of the alumina component however, and it is therefore preferred to employ clay-alumina catalysts containing between about 40% and 65% alumina, the remainder being the clay mixture.

The clay-alumina catalysts are useful primarily in conversions which do not primarily involve hydrogenation or dehydrogenation reactions. They may for example be employed for cracking, isomerizing or reforming various hydrocarbon fractions at temperatures between about 900–1200° F., pressures from 0–1000 p. s. i. g., and liquid hourly space velocities between about 0.5 and 10.0.

CLAY-ALUMINA—HEAVY METAL COMPOSITIONS

In its preferred form, the present catalysts contain, in addition to the clay mixture and alumina, one or more of the oxides of the heavy metals having an atomic number of 22 or above. This includes the metals of groups VIB and VIII of the periodic table, specifically chromium, molybdenum, tungsten, uranium, iron, ruthenium, osmium, cobalt, rhodium, iridium, nickel, palladium and platinum. A particularly useful group of catalysts for conversion processes wherein it is desirable to promote hydrogenation and/or dehydrogenation, are those containing an oxide of a metal from group VIB, specifically molybdenum or chromium. The oxides of cobalt and nickel are also desirable, in addition to the group VIB metal, especially if the feed stock is high in organic sulfur compounds. Catalysts of this group may be compounded by either of two general methods:

*Method 1.*—Here, the clay composite, still preferably consisting of between about 65% and 95% of the bentonite type clay and 5 to 35% of the kaolin type clay, is admixed with alumina and a dry, finely divided oxide of at least one of the heavy metal oxides to be employed, for example molybdenum oxide. The mixture is then wetted to plasticity with any suitable liquid, extruded as described above to form pellets of appropriate size, dried and calcined. After drying, or after calcining, it may be desirable to further impregnate the catalyst with an aqueous solution of another metal salt, such for example as cobalt nitrate or nickel nitrate. The impregnated catalyst is then drained, dried and finally calcined to reduce the impregnated metal salt to its oxide form.

*Method 2.*—According to this method, all the components to be included in the finished catalyst are initially compounded together, and the mixture is then formed into pellets, as by extrusion, and the pellets are then dried and calcined. In one modification of this procedure, the clay composite, alumina, and dry molybdena ($MoO_3$) may be ground together and wetted with an aqueous solution of cobalt nitrate or nickel nitrate of sufficient strength to give the desired ratio of cobalt or nickel oxide in the calcined catalyst when the solution is used in an amount just sufficient to give the desired plasticity to the mix for extrusion. In another modification all the heavy metals to be employed may be added as an aqueous solution of a salt or salts thereof. For this purpose ammoniacal ammonium molybdate or ammonium chromate may be employed, or in general any other salts of the heavy metals which are decomposed to the oxides by heating to e. g. 500 to 1200° F.

Catalysts containing molybdenum and cobalt, prepared by either of the above methods, may have a final composition, after calcining about as follows:

| | Percent |
|---|---|
| Alumina | 35–65 |
| Bentonite clay | 20–45 |
| Kaolin clay | 2.5–12 |
| Molybdenum oxide | 5–15 |
| Cobalt oxide | 1–6 |

Extruded catalysts within the above composition range are found to be substantially equal in hardness to the clay-alumina catalysts; the heavy metal oxides, within the above range of proportions, do not appreciably affect the hardness. Their activity for such hydrocarbon conversions as hydroforming, hydrogenation, dehydrogenation, aromatization, desulfurization and denitrogenation is found to compare favorably with cobalt-molybdenum-alumina catalysts prepared by previous methods.

A practical reference standard for comparing activity and hardness of various cobalt-molybdenum catalysts consists of the catalyst prepared by first impregnating a tableted, activated alumina-silica with a molybdenum salt, calcining to form $MoO_3$, and then impregnating with a cobalt salt followed by calcining to form CoO. Such catalysts are described and claimed in a copending application of Grant W. Hendricks, Serial No. 88,046, filed April 16, 1949, now U. S. Patent No. 2,687,381. The catalysts described herein, even when prepared by extrusion, are found to be almost equal in hardness to the tableted impregnated alumina catalysts of the Hendricks application, and substantially equal or superior in activity.

Figure 2:
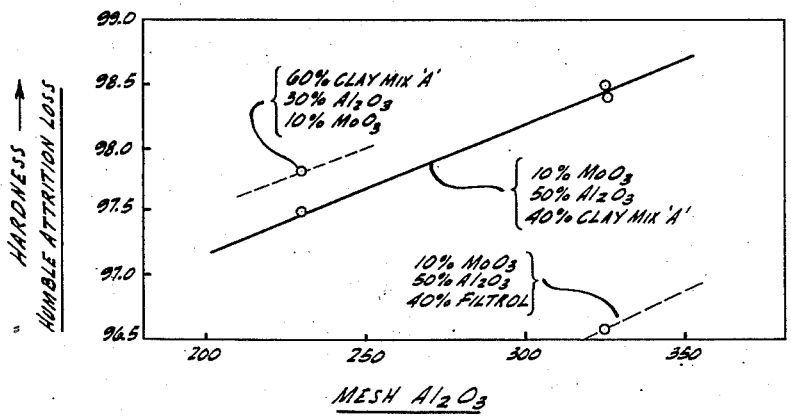

Figure 2 is a graphic representation showing hardness vs. alumina mesh size in molybdenum containing catalysts, and also showing the relative hardness of such catalysts containing varying ratios of alumina-to-clay, and Filtrol clay to Ball clay. The detailed significance of this figure will be evident from the following example which is illustrative only.

*Example II*

Catalysts having the calcined composition listed in Table 2 were prepared by intimately mixing the alumina (activated gel type) with the indicated proportions of clays and powdered molybdenum trioxide, adding sufficient water to give a stiff plastic consistency to the mix and then extruding it through 3/16" circular orifices. The extrude was cut off in approximately 3/16" lengths, dried, calcined at 1100° F. for approximately 7 hours and then tested for hardness in the Humble attrition apparatus. The results were as follows:

TABLE 2

| Catalyst | Composition, percent by Dry Weight | | | | | Hardness |
|---|---|---|---|---|---|---|
| | 230 Mesh $Al_2O_3$ | 330 Mesh $Al_2O_3$ | Filtrol | Ball Clay | $MoO_3$ | |
| 1 | 30 | | 51 | 9 | 10 | 97.8 |
| 2 | 50 | | 34 | 6 | 10 | 97.5 |
| 3 | | 50 | 34 | 6 | 10 | 98.5 |
| 4 | | 50 | 34 | 6 | 10 | 98.4 |
| 5 | | 50 | 40 | | 10 | 96.1 |

Catalysts 2, 3 and 4 are correlated in Fig. 2 to show the effect on hardness of difference in alumina mesh size. Catalyst 1 shows a slight increase in hardness over 2 due to the higher clay content. Catalyst 5 shows strikingly the effect of omitting kaolin clay from the composition; a lowering in hardness of over 2 points resulting, as compared to catalysts 3 and 4. This difference is highly significant when translated from the experimental to commercial scale.

*Example III*

The procedure employed for preparing catalysts 3 and 4 in Example II is repeated except that the final catalyst is impregnated with cobalt by immersing in a 20% aqueous solution of cobaltous nitrate hexahydrate, draining, drying, and again calcining at 1100° F. for 6 hours to decompose the salt to cobalt oxide. The final catalyst contains about 3% CoO. Hardness, as measured above, is found to be about 98.6, the slight improvement probably being due to the second calcining.

*Example IV*

A nickel-alumina-clay catalyst is prepared by first mixing 210 grams of Filtrol with 24 grams of Ball clay until a homogeneous powder is obtained. The clay mixture is then thoroughly mixed with 200 grams of precipitated, activated alumina (320 mesh) and 40 grams of dry powdered molybdenum trioxide. The dry mixture is then wetted with 150 grams of a 40% aqueous solution of nickelous nitrate hexahydrate. A stiff paste is formed which is then extruded through 3/16 inch dies under 200 p. s. i. g. pressure, and the extrude cut into 1/8" lengths. After drying and calcining for 8 hours at 1200° F. the pellets are found to have a Humble-attrition hardness of about 97, and a composition as follows (dry basis):

| | Weight percent |
|---|---|
| Filtrol | 39.0 |
| Ball clay | 4.2 |
| $Al_2O_3$ | 44.0 |
| $MoO_3$ | 8.9 |
| NiO | 3.5 |

The catalysts shown in Examples II, III and IV, and other similar compositions containing one or more heavy metal oxides are all eminently suitable for effecting various hydrocarbon conversion reactions such as desulfurization, denitrogenation, hydrogenation, hydroforming, reforming, cracking, destructive hydrogenation, and the like. Such reactions are carried out generally by contacting the catalyst with a hydrocarbon feed stock at a temperature between about 500° and 1500° F. and preferably in the presence of hydrogen such as recycle hydrogen gas. During usage, varying amounts of deposits comprising mostly carbon, nitrogen and sulfur compounds accumulate on the catalyst and are periodically removed by regeneration. Regeneration is effected by passing air diluted with flue gas, steam, nitrogen, or other inert gas over the catalyst to combust the deposits while maintaining the temperature of the catalyst between about 800° and 1050° F. The combustion is completed in the presence of undiluted air while maintaining the temperature of the catalyst between about 800° and 1050° F. The regenerated catalyst, after reduction with hydrogen, has practically the same catalytic activity as the freshly prepared catalyst even after a large number of regenerations.

For the purpose of desulfurizing petroleum stocks, shale distillates and the like, the catalysts of this invention are employed under the following conditions: reaction temperatures between about 600° to 1000° F., pressures between about atmospheric to 5000 lbs./sq. in. or more, and space velocities between about 0.2 and 10.0 volume of liquid feed stock/vol. of catalyst/hr., and 500 to 10,000 cu. ft. of added hydrogen/bbl. of feed. The particular set of conditions is determined by the stock to be desulfurized and by the nature of the product desired.

The catalysts described herein can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are employed: reactor temperatures between about 700° and 1000° F., pressures between about 500 and 10,000 lbs./sq. in., feed rates between about 0.2 and 10.0 volume of liquid feed stock/vol. of catalyst/hr., and about 1,000 to 10,000 cu. ft. of added hydrogen/bbl. of feed. For the removal of nitrogen it is generally desirable to employ a two-stage denitrogenation process wherein the ammonia synthesized in the first stage is removed from the first stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalysts of this invention may also be employed for hydroforming, which process serves to reform a gasoline range hydrocarbon stock and increase its aromatic content. For processing stocks for the purpose of reforming and increasing their aromaticity, the following conditions are employed: reaction temperatures between about 800° and 1200° F., pressures between about 50 to 1000 lbs./sq. in., space velocities between about 0.2 and 4.0 vol. of liquid feed stock/vol. of catalyst/hr., and about 1,000 to 10,000 cu. ft. of added hydrogen/bbl. of feed. The specific conditions are determined by the nature of the specific feed stock employed and the quality of the product desired.

The following example is cited to show typical results which may be obtained in utilizing the present catalysts for hydroforming a feed stock.

*Example V*

An extruded catalyst was prepared by the procedure outlined in Example III, utilizing 325 mesh activated alumina, the final catalyst having the dry analysis:

| | Weight percent |
|---|---|
| $Al_2O_3$ | 48.5 |
| Filtrol | 33.0 |
| Ball clay | 6.0 |
| $MoO_3$ | 9.5 |
| CoO | 3.0 |

This catalyst was employed in a hydroforming operation on a high-naphthenic, straight run gasoline stock boiling between 210–260° F., and containing 0.01% sulfur. The operating conditions were:

| | |
|---|---|
| Pressure | 200 p. s. i. g. |
| LHSV | 1. |
| Hydrogen | 2000 S. C. F./bbl. feed. |
| Temperature | 900° F. |

The results were as follows:

TABLE 3

| | Feed | Product |
|---|---|---|
| Vol. percent yield ($C_4+$) | | 85.0 |
| Gravity, °API, at 60° F. | 55.6 | 46.2 |
| Olefins, Vol. percent | 0.2 | 4.6 |
| Aromatics, Vol. percent | 13.8 | 54.2 |
| Aromatics synthesized, Vol. percent | | 32.3 |
| Octane No.: | | |
| F-1 Clear | 53.5 | 93.5 |
| F-1+3 ml. TEL | 77.0 | iso+0.04 |
| Gas Analysis: | | |
| $H_2$ make S. C. F./Bbl. feed | | 855 |
| $C_1$–$C_3$ make S. C. F./Bbl. Feed | | 295 |
| Carbon, wt. percent feed | | 1.0 |

This example illustrates the high aromatic synthesis and octane improvement, as well as the low $C_1$–$C_3$ gas-make and high hydrogen make which is obtainable with the herein disclosed catalysts. Similar results are achieved by substituting nickel for cobalt and chromium for the molybdenum.

*Example VI*

The same catalyst employed in Example V is used to hydrodesulfurize a Santa Maria Valley (California) straight-run gas oil having a boiling range of 395–650° F., an API gravity of 33.4 and a sulfur content of 2.2%. The operating conditions are:

| | |
|---|---|
| Temperature | 750° F. |
| Pressure | 500 p. s. i. g. |
| Hydrogen | 3000 S. C. F./bbl. feed. |
| LHSV | 2.0. |

The product collected over a 6 hour run contains an average sulfur content between about 0.04% and 0.08%, this consitituting approximately a 96.5% to 98% sulfur removal.

From the above description it is clear that the catalysts described herein combine a highly economical method of manufacture with high catalytic activity and a high degree of attrition-resistance. The foregoing disclosure should not however be considered as limiting, since many variations may be made by those skilled in the art without departing from the scope or spirit of the following claims.

I claim:

1. A method for bonding small catalyst particles into larger granules having a high resistance to abrasion which comprises distributing said small catalyst particles in intimately bonded relationship within a clay composite, said clay composite having been formed by intimately mixing water, a powdered acid-washed bentonite clay and a powdered kaolin clay to form a moist plastic mass, the weight-ratio of kaolin/bentonite in said plastic mass being between about 35/65 and 5/95 on a dry basis, shaping said plastic mass into the form desired for said catalyst granules, and subsequently drying and calcining the shaped granules.

2. A method as defined in claim 1 wherein said distributing of small catalyst particles within said clay composite is carried out by intimately incorporating said small catalyst particles within said moist plastic mass prior to said shaping, drying and calcining steps.

3. A method as defined in claim 1 wherein said distributing of small catalyst particles within said clay composite is carried out by intimately incorporating an aqueous solution of a compound of a catalytically active component into said moist plastic mass prior to said shaping, drying and calcining steps, and subsequently decomposing said compound during calcining to form said small catalyst particles.

4. A method as defined in claim 1 wherein said distributing of small catalyst particles within said clay composite is carried out by impregnating the pre-formed calcined clay composite with an aqueous solution of a compound of a catalytically active component, and thereafter drying and calcining the impregnated composite to decompose said impregnated compound and form said small catalyst particles.

5. An abrasion-resistant catalyst granule comprising at least about 10% by weight of a homogeneously distributed clay composite coextensive with the volume of said catalyst granule, any remainder of said catalyst granule being composed of finely-divided, catalytic material intimately bonded into said clay composite, said clay composite having been formed by a method including the steps of intimately admixing water, a powdered acid-washed bentonite clay and a powdered kaolin clay, thereby forming a moist plastic mass, the weight-ratio of kaolin/bentonite in said plastic mass being between about 35/65 and 5/95 on a dry basis, shaping a portion of said plastic mass into the form desired for said catalyst granule, and subsequently drying and calcining the shaped granule.

6. An abrasion-resistant catalyst granule consisting essentially of a composite of intimately mixed kaolin clay and acid-washed bentonite clay, said composite having been formed by a method including the steps of intimately admixing water, a powdered acid-washed bentonite clay and a powdered kaolin clay, thereby forming a moist plastic mass, the weight ratio of kaolin/bentonite in said plastic mass being between about 35/65 and 5/95 on a dry basis, shaping a portion of said plastic mass into the form desired for said catalyst granule, and subsequently drying and calcining the shaped granule.

7. An abrasion-resistant catalyst granule comprising between about 10% and 70% by weight of a homogeneously distributed clay composite coextensive with the volume of said catalyst granule, and between about 90% and 30% of an adsorbent gel-type oxide selected from the group consisting of silica, alumina, silica-alumina, titania, thoria, zirconia and magnesia, said catalyst granule having been formed by a method including the steps of intimately admixing water, a powdered acid-washed bentonite clay, a powdered kaolin clay and said adsorbent gel-type oxide in powdered form, thereby forming a moist plastic mass, the weight ratio of kaolin/bentonite in said plastic mass being between about 35/65 and 5/95 on a dry basis, shaping a portion of said plastic mass into the form desired for said catalyst granule, and subsequently drying and calcining the shaped granule.

8. A catalyst granule as defined in claim 7 wherein said adsorbent gel-type oxide is alumina gel.

9. A catalyst as defined in claim 7 wherein said adsorbent gel-type oxide is powdered alumina gel having an average particle size smaller than about 300 mesh.

10. An abrasion-resistant catalyst granule comprising between about 22.5% and 57% by weight of a homogeneously distributed clay composite coextensive with the volume of said catalyst granule, between about 35% and 65% by weight of an adsorbent gel-type oxide selected from the group consisting of silica, alumina, silica-alumina, titania, thoria, zirconia and magnesia and between about 6% and 21% by weight of a catalytic oxide selected from the class consisting of group VI B metal oxides and group VIII metal oxides, said gel-type oxide and said catalytic oxide being finely divided and bonded within said clay composite, said clay composite having been formed by a method including the steps of intimately admixing water, a powdered acid-washed bentonite clay, a powdered kaolin clay and said adsorbent gel-type oxide in powdered form, thereby forming a moist plastic mass, the weight-ratio of kaolin/bentonite in said plastic mass being between about 35/65 and 5/95 on a dry basis, shaping a portion of said plastic mass into the form desired for said catalyst granule, and subsequently drying and calcining the shaped granule.

11. A catalyst granule as defined in claim 10 wherein said adsorbent gel-type oxide is alumina gel.

12. A catalyst as defined in claim 10 wherein said adsorbent gel-type oxide is powdered alumina gel having an average particle size smaller than about 300 mesh.

13. An abrasion-resistant catalyst granule comprising between about 22.5% and 57% by weight of a homogeneously distributed clay composite coextensive with the volume of said catalyst granule, between about 35% and 65% by weight of an adsorbent gel-type oxide selected from the group consisting of silica, alumina, silica-alumina, titania, thoria, zirconia and magnesia, and between about 5% and 15% by weight of molybdenum oxide, said gel-type oxide and said molybdenum oxide being finely divided and bonded within said clay composite, said clay composite having been formed by a method including the steps of intimately admixing water, a powdered acid-washed bentonite clay, a powdered kaolin clay and said adsorbent gel-type oxide in powdered form, thereby forming a moist plastic mass, the weight-ratio of kaolin/bentonite in said plastic mass being between about 35/65 and 5/95 on a dry basis, shaping a portion of said plastic mass into the form desired for said catalyst granule, and subsequently drying and calcining the shaped granule.

14. A catalyst granule as defined in claim 10 wherein said adsorbent gel-type oxide is alumina gel.

15. A catalyst as defined in claim 7 wherein said adsorbent gel-type oxide is powdered alumina gel having an average particle size smaller than about 300 mesh.

16. An abrasion-resistant catalyst granule comprising between about 22.5% and 57% by weight of a homogeneously distributed clay composite coextensive with the volume of said catalyst granule, between about 35% and 65% by weight of an adsorbent gel-type oxide selected from the group consisting of silica, alumina, silica-alumina, titania, thoria, zirconia and magnesia, and between about 5% and 15% by weight of molybdenum oxide, and between about 1% and 6% by weight of cobalt oxide, said gel-type oxide, said molybdenum oxide and said cobalt oxide being finely divided and bonded within said clay composite, said clay composite having been formed by a method including the steps of intimately admixing water, a powdered acid-washed bentonite clay, a powdered kaolin clay and said adsorbent gel-type oxide in powdered form, thereby forming a moist plastic mass, the weight-ratio of kaolin/bentonite in said plastic mass being between about 35/65 and 5/95 on a dry basis, shaping a portion of said plastic mass into the form desired for said catalyst granule, and subsequently drying and calcining the shaped granule.

17. A catalyst granule as defined in claim 10 wherein said adsorbent gel-type oxide is alumina gel.

18. A catalyst as defined in claim 7 wherein said adsorbent gel-type oxide is powdered alumina gel having an average particle size smaller than about 300 mesh.

References Cited in the file of this patent

UNITED STATES PATENTS

| Number | Name | Date |
| --- | --- | --- |
| 2,369,001 | Ahlberg et al. | Feb. 6, 1945 |
| 2,478,194 | Houdry | Aug. 9, 1949 |
| 2,486,361 | Nahin et al. | Oct. 25, 1949 |

OTHER REFERENCES

"Catalyst of the Activated Montmorillonite Type," Davidson et al., Nat. Pat. News, pages R 318–321, July 7, 1943.